Nov. 6, 1928.

I. J. OWEN 1,690,832

COMBINATION PAPER CUTTING TOOL, RULE, AND
DRAFTING AND MEASURING INSTRUMENT

Filed Nov. 24, 1924    2 Sheets-Sheet 1

INVENTOR
Ira J. Owen
BY Chappell & Earl
ATTORNEYS

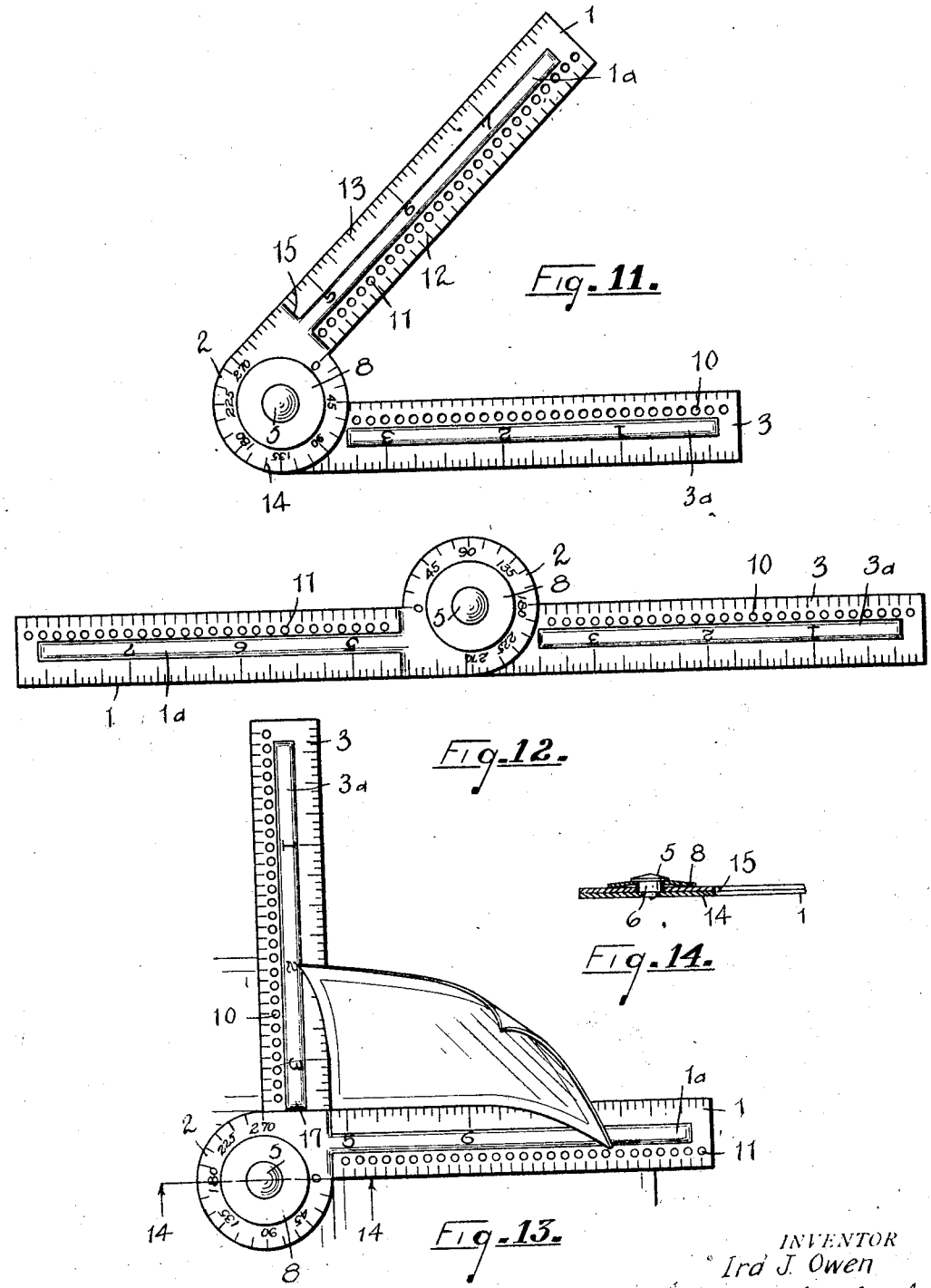

Patented Nov. 6, 1928.

1,690,832

UNITED STATES PATENT OFFICE.

IRA J. OWEN, OF GRAND RAPIDS, MICHIGAN.

COMBINATION PAPER-CUTTING TOOL, RULE, AND DRAFTING AND MEASURING INSTRUMENT.

Application filed November 24, 1924. Serial No 751,993.

This invention relates to an improved combination paper cutting tool, rule and drafting and measuring instrument.

The object of the invention is to provide such a tool, very flat and compact and to embrace in simple form, a paper cutter, a rule, straight edge, divider and protractors, the structure being especially well adapted for clipping coupons from bonds.

Objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. 11 is a plan view of the ruler open for use as a protractor showing the method of using the circuluar scale.

Fig. 12 is a view of the structure open straight as a ruler or straight edge.

Fig. 13 shows the structure with the legs or members swung at right angles against stop, as used for a coupon clipper or similar purpose.

Fig. 14 is a detail sectional view on line 14—14 of Fig. 13, showing the contact of the pivoted member in the right angle position.

In the drawing similar reference characters refer to similar parts throughout the several views, and the sectional views are taken looking in the direction of the little arrows at the ends of the section lines.

Figure 1:
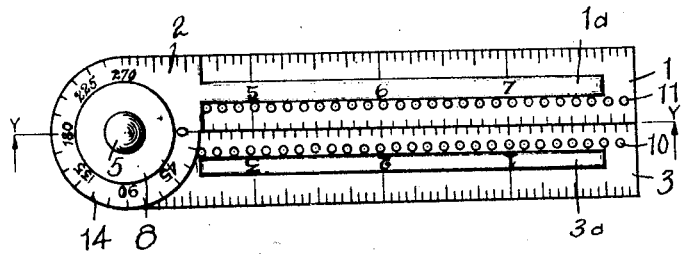
Fig. 1 is a plan view of my improved combination tool in its closed position.
Figure 2:
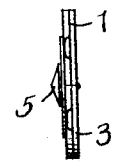
Fig. 2 is an end elevation thereof from the right hand end.
Figure 3:
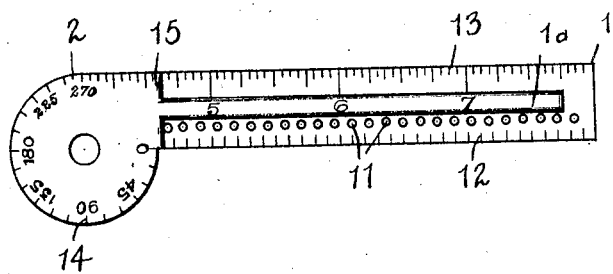
Fig. 3 is a detail plan view of the main part with the circular protractor scale.
Figure 4:
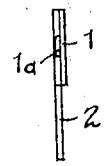
Fig. 4 is an end elevation from the right hand end of Fig. 2.
Figure 5:
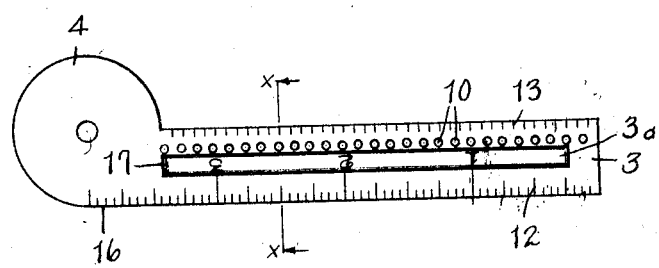
Fig. 5 is a plan view of the pivoted blade or member with its flat pivoting head.
Figure 6:
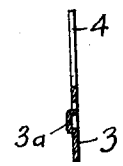
Fig. 6 is a detail sectional view on line x—x of Fig. 5 showing the form of the cross section of the leg or ruler member.
Figure 7:
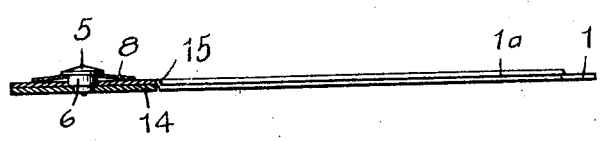
Fig. 7 is a detail sectional view on line y—y of Fig. 1, showing the details of construction of the pivoted parts.
Figure 8:
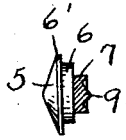
Fig. 8 is an enlarged detail elevation view partially in section of the shouldered pivot rivet.
Figure 9:
Fig. 9 is a detail sectional view of the concavo convex spring washer taken on line 9—9 of Fig. 10.
Figure 10:
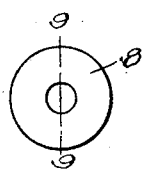
Fig. 10 is a plan view of such spring washer.

The parts of the drawings will be referred to by numbers. 1 is the main shouldered member bearing the protractor graduated disk 2. 3 is the pivoted member having a flat disk 4 co-operating with the protractor disk 2 and the main member. These parts are held together by the shouldered pivot rivet 5 (Figs. 7, 8 and 14). Pivot part 6 receives the protractor disk of the main member and the rivet part 7 extends through the pivoted member and is riveted thereto. A rounded projecting central part 9 serves as a pivot or center when the structure is used as a compass or divider.

A concavo-convex spring washer 8 is placed with its convex side in contact with the shoulder 6' of the shouldered pivot. A series of holes 10 and 11 serve to receive the point of a pencil for the drawing of circles or making divisions, when the structure is held in pivoted relation by pushing down on the head of the pivot rivet 5 and forcing the projecting rounded part 9 into close contact with any surface on which the tool may rest. Different scales 12 and 13 are formed on the opposite sides of the legs of this ruler and a graduated circular scale 14 is on the end 2. A shoulder 15 is formed on the main member which offsets the graduated disk 2 so that the structure is perfectly flat on its under surface. The main member is shouldered at 15 at right angles to receive the edge 16 of the pivoted member when swung to the right angle position when the tool is used for clipping coupons or the like.

Central ribs 1ª and 3ª are formed longitudinally of the members, the rib 3ª terminating in a shoulder 17 at a point which gives clearance for the adjustment of the pivoted member through the right angle position, as illustrated in Fig. 14. The manner of clipping a coupon from a bond is illustrated in Fig. 13.

The uses of the structure are quite obvious as a ruler. A variety of scales is provided, one in tenths of an inch for typewriter use; another divided into sixteenths. The form of the legs so that they can be made use of as a letter opener or paper knife generally, in addition to the function for tearing in straight lines or angles, is of advantage.

The structure is very compact and can be carried in the pocket or put in a flat case and conveniently made use of. It is compact, strong and serves all its purposes very well.

Having thus described my invention, what I claim as new and desire to secure by Letters Patent is:

1. In a combination tool, a ruler made up of symmetrical pivoted halves with hinge disks superposed one upon the other, the main one being offset to form a shoulder for locating the pivoted member, the same being provided with graduations, a shouldered pivot rivet for retaining the parts in position, a concavo-convex spring washer under the head of the pivot to hold the parts yieldingly and in frictional contact with each other, the said rivet having a projecting surface-engaging pivot point, and a series of staggered perforations on the said members for the receipt of a pencil point for drafting purposes, all coacting substantially as described for the purpose specified.

2. In a combination tool, a ruler made up of symmetrical pivoted halves with hinge disks superposed one upon the other, the main one being offset to form a shoulder for locating the pivoted member, the same being provided with graduations, a pivot rivet for retaining the parts in position, the said rivet having a projecting surface engaging pivot point with rounded central projection, and a series of staggered perforations on said members for the recept of a pencil point for drafting purposes, coacting as described for the purpose specified.

In witness whereof I have hereunto set my hand.

IRA J. OWEN.